United States Patent
Conny et al.

(10) Patent No.: US 7,520,558 B2
(45) Date of Patent: Apr. 21, 2009

(54) OPEN-TOP CARGO BOX WITH A TARP BOW RETAINING APERTURE

(75) Inventors: Michael A. Conny, Beloit, OH (US); James A. Maiorana, Hartville, OH (US); James S. Arnold, Uniontown, OH (US)

(73) Assignee: Mac Trailer Manufacturing, Inc., Alliance, OH (US)

( * ) Notice: Subject to any disclaimer, the term of this patent is extended or adjusted under 35 U.S.C. 154(b) by 111 days.

(21) Appl. No.: 11/890,829

(22) Filed: Aug. 8, 2007

(65) Prior Publication Data

US 2009/0039670 A1 Feb. 12, 2009

(51) Int. Cl.
*B62D 33/00* (2006.01)
(52) U.S. Cl. ............... 296/185.1; 296/104; 296/100.18
(58) Field of Classification Search .............. 296/185.1, 296/104, 100.17, 100.14, 100.18, 40
See application file for complete search history.

(56) References Cited

U.S. PATENT DOCUMENTS

| | | | |
|---|---|---|---|
| 2,955,874 A | 10/1960 | Brindley | |
| 3,126,224 A | 3/1964 | Carter, Jr. et al. | |
| 3,226,153 A | 12/1965 | Haid | |
| 3,384,413 A | 5/1968 | Sargent | |
| 3,971,590 A | 7/1976 | Yglesias | |
| 4,248,475 A | 2/1981 | Johnsen | |
| 4,854,633 A | 8/1989 | Kraft et al. | |
| 5,288,123 A * | 2/1994 | Dimmer | 296/100.17 |
| 5,664,824 A | 9/1997 | Stephens et al. | |
| 5,860,547 A * | 1/1999 | Cozzolino et al. | 220/1.5 |

* cited by examiner

*Primary Examiner*—Dennis H Pedder
*Assistant Examiner*—Pinel E Romain
(74) *Attorney, Agent, or Firm*—Sand & Sebolt (57) ABSTRACT

An open-top cargo box for a truck trailer that is selectively coverable with bow-supported tarpaulin system. The cargo box has an interior cavity defined by front and rear walls connected together by a pair of longitudinally extending side walls. Each side wall has an upper horizontal surface defining a plurality of spaced-apart apertures therein. Each aperture has a first cross-sectional shape and a first size. The bows that support the tarpaulin include vertically oriented ends, each of which has a second cross-sectional shape and a second size. The second shape and size of the ends of the bows is smaller than the first shape and size of the apertures. Consequently, if the side walls of the cargo box spread apart under pressure exerted by a load carried in the cavity, the ends of the bows slidably move within the apertures in the side walls in a direction substantially perpendicular to the longitudinal axes of the side walls. The side walls may be reinforced proximate the apertures. Alternatively, each aperture is formed as a bore of an insert that is tightly received in any one of a plurality of holes in the upper surface of the side walls. The inserts may include markers on an outer surface thereof to enable the bore to be correctly aligned relative to the longitudinal axis of the side wall. Preferably, the apertures are oblong or elliptical in shape and the ends of the bows are circular in cross-section so that the ends may move from side to side within the apertures.

20 Claims, 7 Drawing Sheets

OPEN-TOP CARGO BOX WITH A TARP BOW RETAINING APERTURE

BACKGROUND OF THE INVENTION

1. Technical Field

This invention generally relates to transportation vehicles. More particularly, the invention relates to vehicles having an open-top cargo box that is selectively coverable with a bow-supported tarpaulin. Specifically, the invention relates to a cargo box that has a plurality of apertures formed in an upper surface of the side walls and which are sized to loosely receive the ends of the tarpaulin bows therein so as to permit lateral sliding motion of the ends within the apertures if the side walls spread apart under pressure exerted by a load carried in the cargo box.

2. Background Information

In the United States, trucks are used to transport a wide variety of goods from one side of the country to the other. Some of these trucks are of the type having an open cargo box or trailer into which the goods are placed. Tarpaulin systems may be used on these trailers to cover the loads therein during transportation of the same. This is especially true of loads such as grain or sand where the tarpaulin both prevents granules from blowing out of the trailer and protects the load from the elements.

A wide variety of tarpaulin systems are available for this purpose including systems in which a tarpaulin is supported across the trailer opening by a plurality of bows or ribs. The bows typically have an arcuate portion with downwardly extending first and second ends. In U.S. Pat. No. 4,854,633, issued to Kraft et al, the first end of each bow is received in a recess formed in the upper rail of the trailer and the second end of the bow is received in a retaining ring provided on the opposite upper rail. A locking mechanism is provided to rigidly secure the second ends of the bows in place and substantially prevent them from being moving or becoming disengaged from the second upper rail. As shown in the drawings of the patent, both the first and second ends of the bows are tightly received within the recess and retaining ring to secure the bows to the trailer body.

U.S. Pat. No. 2,955,874, issued to Brindley, show tarpaulin bows in which the downwardly extending first and second legs are tightly received within tubular sockets disposed between the inner and outer walls of the trailer body.

U.S. Pat. No. 4,248,475, issued to Johnsen, shows the first and second ends of the bows each being tightly retained in an aperture formed between an U-shaped flange and the side of one of the first and second upper rails. Once again, the first and second ends of the bows are tightly received within the apertures and are thereby prevented from moving in any direction within the apertures.

U.S. Pat. No. 3,971,590, issued to Yglesias, discloses a trailer in which recesses are formed in the upper rails and a sleeve is inserted into each recess. The downwardly extending first and second ends of the bows are tightly received within the bores of the sleeves, thereby firmly retaining the bows in place.

Similarly, in the tarpaulin system disclosed in U.S. Pat. No. 3,384,413, issued to Sargent, each of the first and second ends of the bows are tightly received within a sleeve that is itself tightly received within a recess in the upper rails. A similar system is also found in U.S. Pat. No. 5,664,824 to Stephens et al; U.S. Pat. No. 3,226,153 to Haid, and U.S. Pat. No. 3,126,224 to Carter Jr. et al.

While these systems all work adequately for the purpose for which they were intended, in some instances, the bows used in these tarpaulin systems will be prone to damage and failure. This is especially true when the trailer is between fifty and eighty feet long and is used to transport loads such as grain or sand. Grain or sand tends to spread out within the cargo box of a railer and bring a substantial amount of pressure to bear upon the side walls. The pressure may be great enough to cause the side walls to bow outwardly by as much as one inch. When the first and second ends of the bows are secured in any of the ways disclosed in the previously mentioned patents, the bowing of the side walls tends to damage or break either the ends of the bows or the sleeves or flanges in which they are retained. Furthermore, the distortion in the walls frequently prevents the removal of the damaged components until after the grain or sand has been unloaded from the trailer.

There is therefore a need in the art for an improved mechanism for securing a tarpaulin system to a long bed open-top truck trailer that reduces the likelihood of breakage of the bows during transport of loads such as grain or sand.

SUMMARY OF THE INVENTION

The device of the present invention comprises an open-top cargo box for a truck trailer that is selectively coverable with a bow supported tarpaulin system. The cargo box has an interior cavity defined by front and rear walls connected together by a pair of longitudinally extending side walls. Each side wall has an upper horizontal surface which defines a plurality of spaced-apart apertures therein. Each aperture has a first cross-sectional shape and a first size. The bows that support the tarpaulin include vertically oriented ends, each of which has a second cross-sectional shape and a second size. The second shape and size of the ends of the bows are smaller than the first shape and size of the apertures. Consequently, if the side walls of the cargo box spread apart under pressure exerted by a load carried in the cavity, the ends of the bows slidably move within the apertures in the side walls in a direction that is substantially perpendicular to the longitudinal axes of the side walls. The side walls may be reinforced proximate either end of the apertures. Alternatively, each aperture is formed as a bore of an insert that is placed in any one of a plurality of holes provided in the upper surface of the side walls. The inserts may include markers on an outer surface thereof to enable the bore thereof to be correctly aligned relative to the longitudinal axis of the side wall. Preferably, the apertures or bores are oblong or elliptical in shape and the ends of the bows are circular in cross-section.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims. Similar numbers throughout the drawings refer to the same components.

DETAILED DESCRIPTION OF THE INVENTION

Referring to FIGS. 1-12, there is shown a truck 10 of the type having a trailer 12 that is selectively coverable with a tarpaulin system 14. Tarpaulin system 14 includes a tarpaulin 16 that is supported and retained in position by a plurality of bows 18. Trailer 12 includes a cargo box 20 having a front wall 22, a rear wall 24, side walls 26, 28 and a bottom wall 30 that surround and define an interior cavity 32 therein. The load 54 (FIG. 9) is transported in cavity 32 and tarpaulin 16 is used to cover the opening to interior cavity 32 and thereby protect load 54 therein.

Each of the front, rear and side walls 22, 24, 26, 28 of trailer 12 terminates in a horizontal upper surface, namely 22a, 24a, 26a and 28a. It will be understood that for the purpose of this disclosure, side walls 26, 28 may be of any suitable type known in the industry including solid or hollow walls that are secured to bottom wall 30 of trailer 12 and extend upwardly away therefrom terminating in a horizontal upper surface 26a, 28a. Alternatively, side walls 26, 28 may be secured between upper and lower rails with the horizontal upper surface being part of the upper rail. Furthermore, pockets or retainers may be welded or otherwise secured at spaced intervals to either the side wall or upper rail and the horizontal upper surface 26a, 28a may be a surface of that pocket or retainer. Side walls 26, 28 as shown in the attached figures, are of the type that includes a hollow upper rail 50 having an interior bottom wall 52 spaced a distance "A" away from upper surface 26a, 28a.

Figure 1:
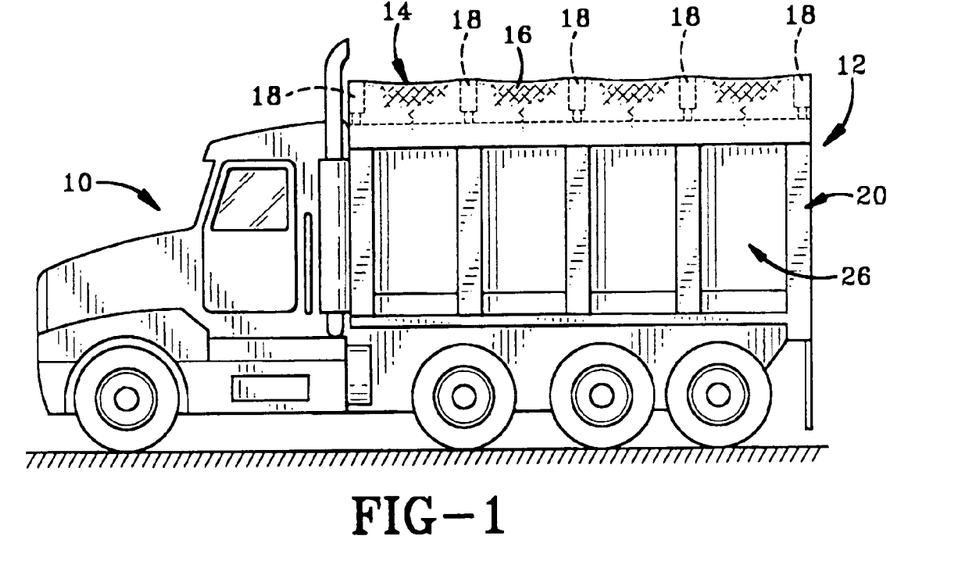
FIG. 1 is a side elevational view of a transport truck that includes an open topped cargo box which is covered with a bow-supported tarpaulin.
Figure 2:
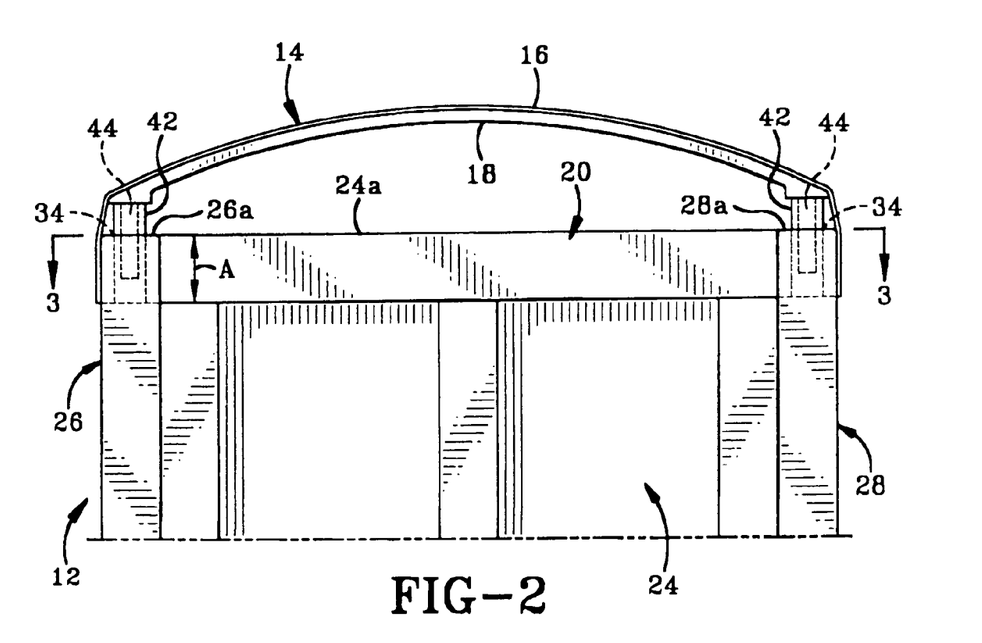
FIG. 2 is a partial rear view of the cargo box in accordance with the present invention.
Figure 3:
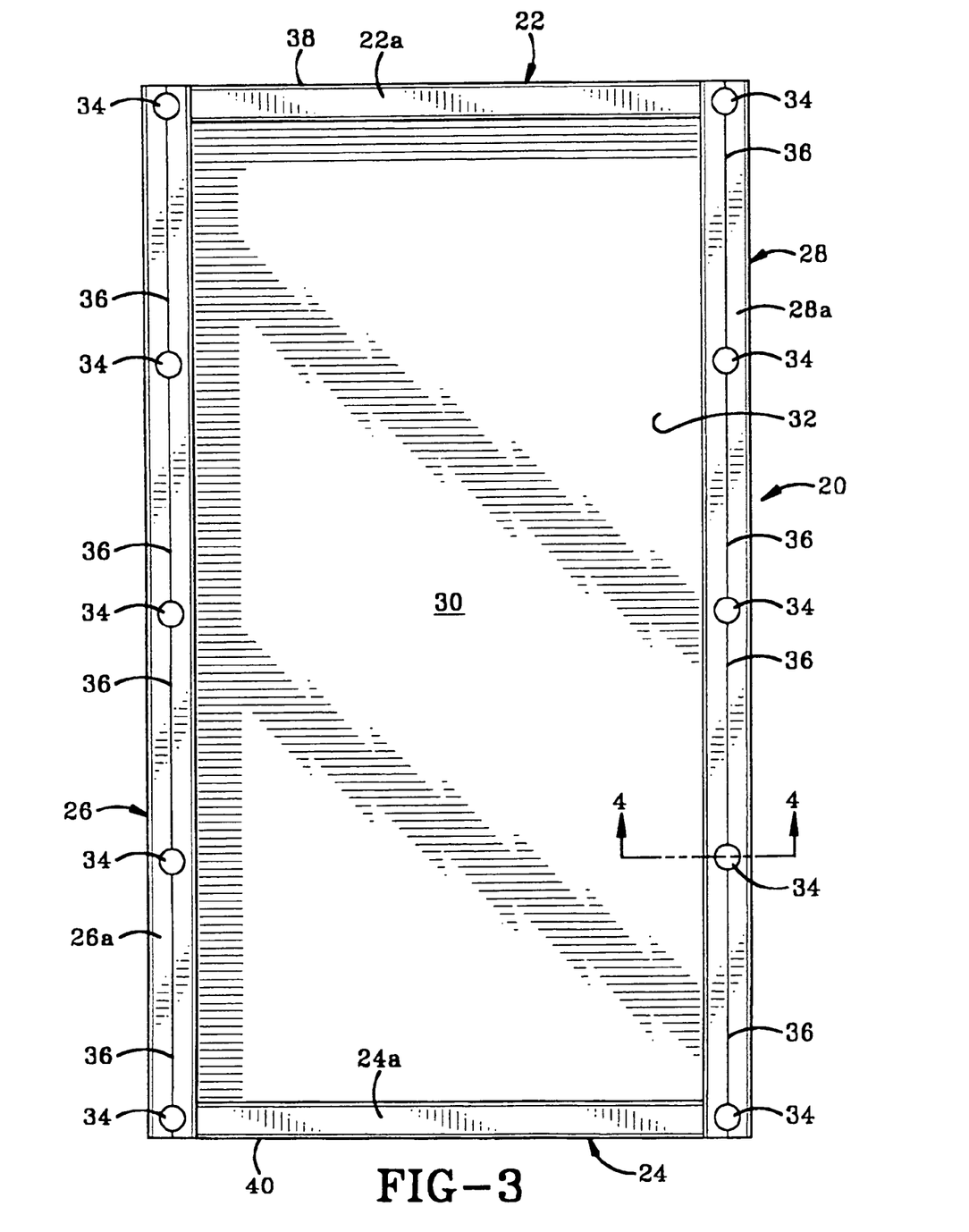
FIG. 3 is a top view of the cargo box through line 3-3 of FIG. 2.

In accordance with a specific feature of the present invention, a plurality of spaced-apart holes 34 are drilled into the upper surfaces 26a, 28a of side walls 26, 28. Each hole 34 preferably is generally circular in cross-sectional shape (FIG. 2). An indicator line 36 (FIG. 3) is provided on each of the upper surfaces 26a, 28a of side walls 26, 28. Indicator lines 36 may be a chalk line or a permanently marked line that is inscribed or formed on upper surfaces 26a, 28a. Lines 36 preferably extend from a front end 38 of cargo box 20 to a rear end 40 thereof and pass through the center of each hole 34.

Figure 4:
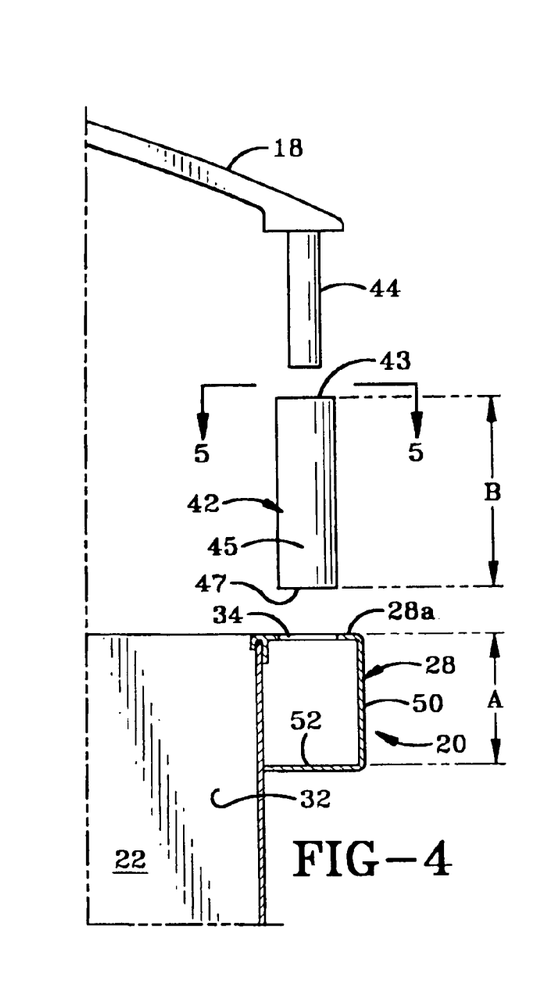
FIG. 4 is an exploded cross-sectional rear view of a right side of the cargo box, the insert and the end of the bow.

In accordance with another specific feature of the present invention, a plurality of molded inserts 42 are provided for retaining the downwardly extending ends 44a, 44b of the bows 18 therein. Each insert 42 preferably is a tubular member having a substantially circular outer wall 45. Outer wall 45 is complementary in shape and size to the holes 34 drilled in side walls 26, 28. Insert 42 has a length "B" as measured from an upper surface 43 to a lower surface 47 thereof. Each insert 42 is provided with a longitudinal bore 48 therethrough. Bore 48 is sized so as to be larger in cross-section than the cross-sectional shape of the end 44 of bow 18. Consequently, end 44 of bow 18 is not tightly received within bore 48 but is instead loosely received therein.

Figures 5, 6:
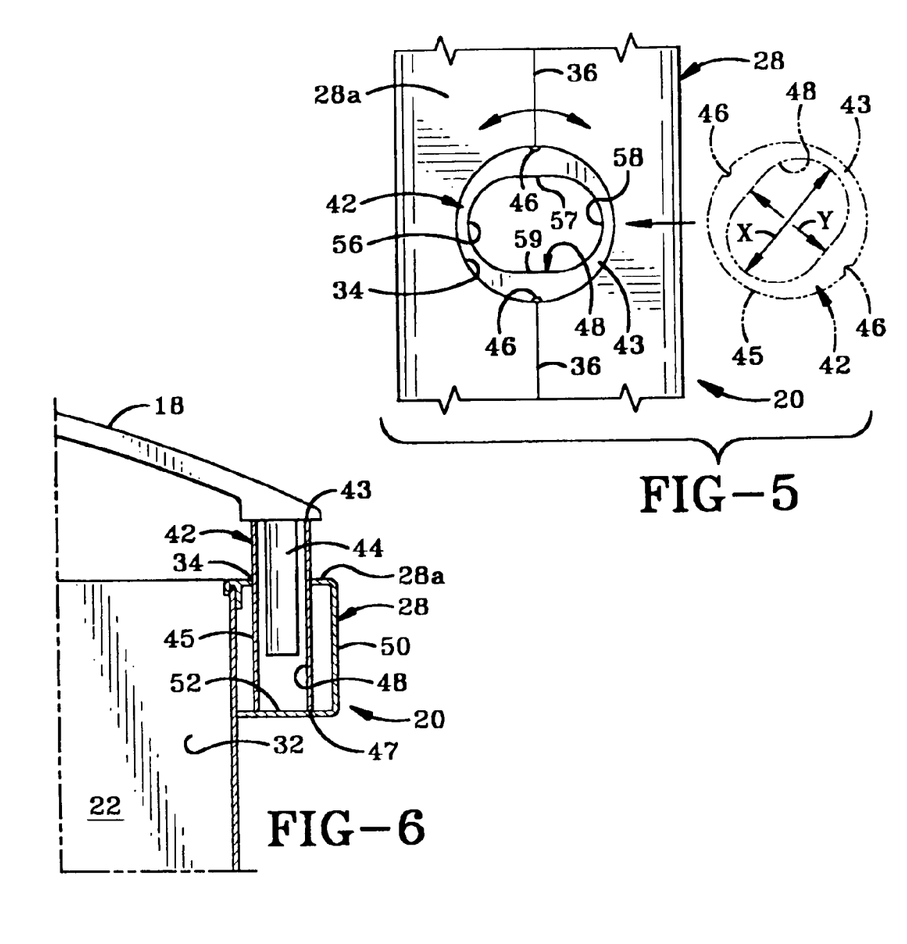
FIG. 5 is a top view of the bow end taken through line 5-5 of FIG. 4; and showing in phantom an alternative positioning of the insert prior to installation in the side wall.
FIG. 6 is a cross-sectional rear view of the right side of the cargo box with the bow end being engaged in the insert.

In the preferred embodiment of the invention, bore 48 preferably is oblong or elliptical in shape. The ends 44 of bow 18 are typically circular in cross-sectional shape. Bore 48 has an arcuate inner and outer end 56, 58 connected together by sections 57, 59. Sections 57, 59 preferably are straight. The distance between inner and outer ends 56, 58 is represented by "X" and the distance between straight sections 57, 59 is represented by "Y", with "X" being greater than "Y". The generally circular ends 44 of bow 18 preferably have a diameter slightly less than "Y" and considerably less than "X". The end 44 of bow 18 consequently is able to move back and forth between inner and outer ends 56, 58 of bore 48 and up and down within length "B" of bore 48. Inserts 42 are positioned in holes 34 in such a way that the bores 48 thereof are oriented so that the sections 57, 59 are at right angles to the longitudinal axes of side walls 26, 28.

In accordance with yet another specific feature of the present invention, inserts 42 are also provided with markers 46 thereon to enable an installer to correctly orient insert 42, and thereby bore 48 in side walls 26, 28 of trailer 12. Markers or divots 46 are provided on one or both of the upper surface 43 and outer wall 45 of each insert 42. In the preferred embodiment of the invention, markers 46 are grooves or indentations formed in one or both of upper surface 43 and outer wall 45. Markers 46 are positioned opposite the center point of each straight section 57, 59 of bore 48.

Figure 7:
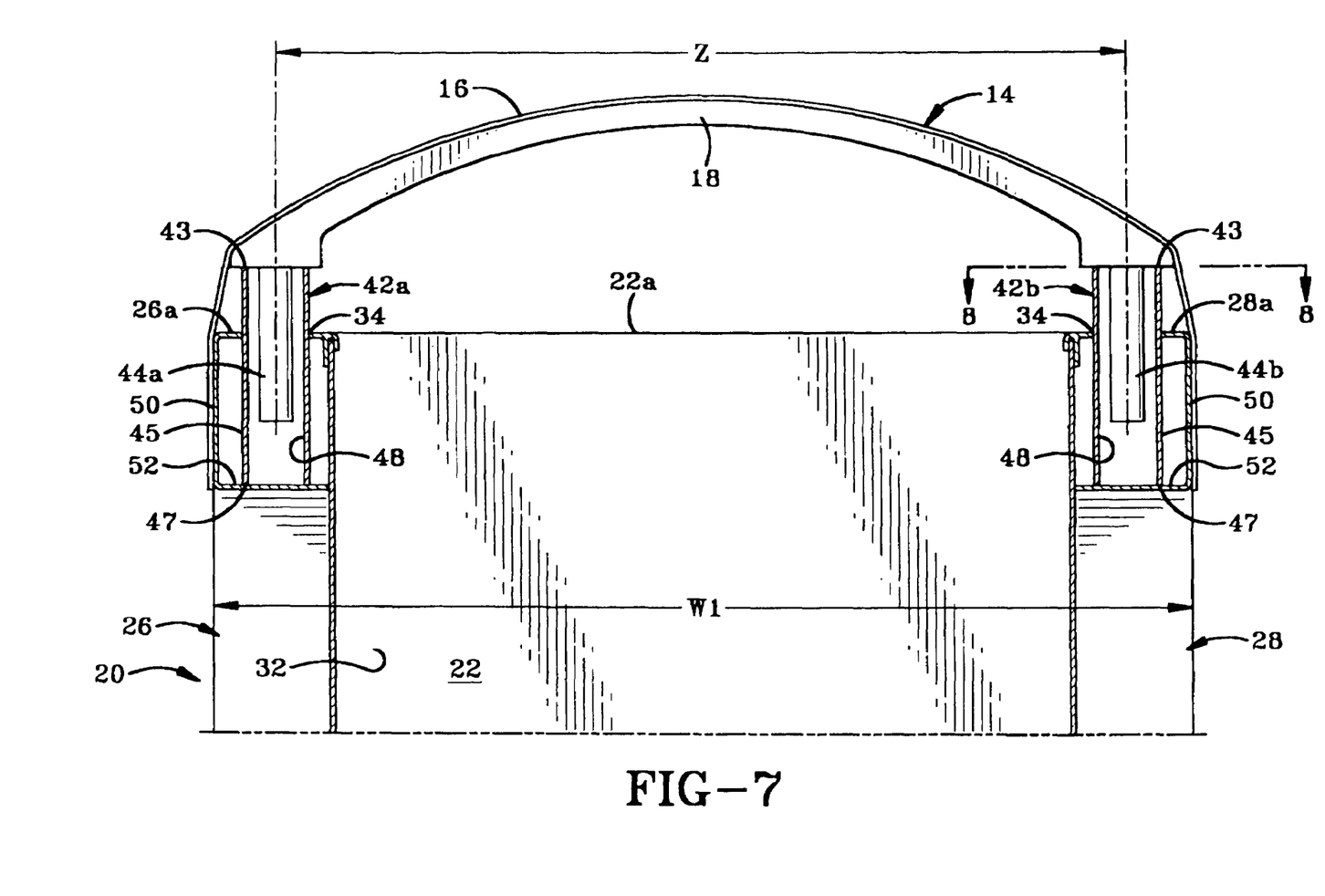
FIG. 7 is a partial cross-sectional rear view of the cargo box and the bow end fully engaged in the insert, and with the cargo box in an empty condition.
Figure 8:
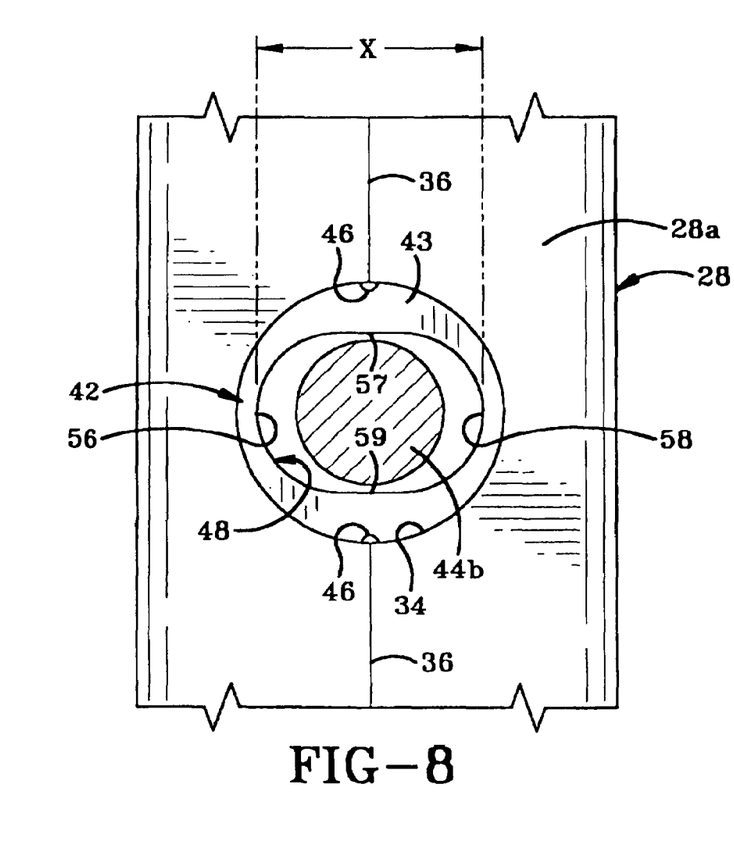
FIG. 8 is a top view of the bow end and insert taken through line 8-8 of FIG. 7.

FIGS. 7 and 8 illustrate how inserts 42 are used. The following description pertains to insert 42b, but it will be understood that insert 42a is installed and used in a substantially identical manner. Insert 42b is press-fit into one of the holes 34 within horizontal upper surface 28a of side wall 28 and is retained therein by friction. Insert 42b is pushed downwardly until it engages bottom wall 52 of rail 50. As shown in FIG. 7, length "B" of insert 42 is greater than depth "A" of hole 34, thus when lower surface 47 contacts wall 52, a first length of insert 42b is retained within the interior of rail 50 and a second length thereof extends upwardly and outwardly away from upper surface 28a thereof.

Insert 42b is rotated until markers 46 are aligned with the indicator line 36 on upper surface 28a of side wall 28 as illustrated in FIG. 8. In this position, bore 48 is oriented so that its length "X" is disposed substantially at right angles to the longitudinal axis of side wall 28 as represented by line 36. Length "Y" of bore 48 is aligned with the longitudinal axis of side wall 28 as represented by line 36. If markers 46 are not aligned in this manner, then bore 48 will be incorrectly positioned relative to the longitudinal axis of side wall 28 for proper functioning of the system. An incorrect orientation of bore 48 will put bow 16 at risk of breaking if side walls 26, 28 deflect under the pressure of a load 54 retained within cavity 32 of trailer 12.

End 44b of bow 16 is then engaged within bore 48 of insert 42b. FIG. 7 shows that end 44b terminates a distance away from bottom wall 52 of rail 50. It will be understood that insert 42b is made to be longer than end 44b that is to be received therein. Thus, end 44b may ride up and down within bore 48 of insert 42b. FIG. 8 shows that end 44b of bow 16 is substantially circular in cross-section and, when end 44b is received within bore 48, it may be positioned substantially centrally within the oblong shape thereof. Thus, end 44b of bow 16 is spaced a distance away from each of inner and outer arcuate ends 56, 58 thereof. End 44b of bow 16 is therefore able to move laterally back and forth along the length "X" of bore 48 and between inner and outer ends 56, 58 thereof and substantially at right angles to the longitudinal axis of side wall 28 (as represented by line 36). Ends 44a, 44b of bow 18 are spaced a distance "Z" (FIG. 7) apart from each other and, because cargo box 20 is not retaining a load therein, the distance between the outer surfaces of side walls 26, 28 is an initial length W1.

Figure 9:
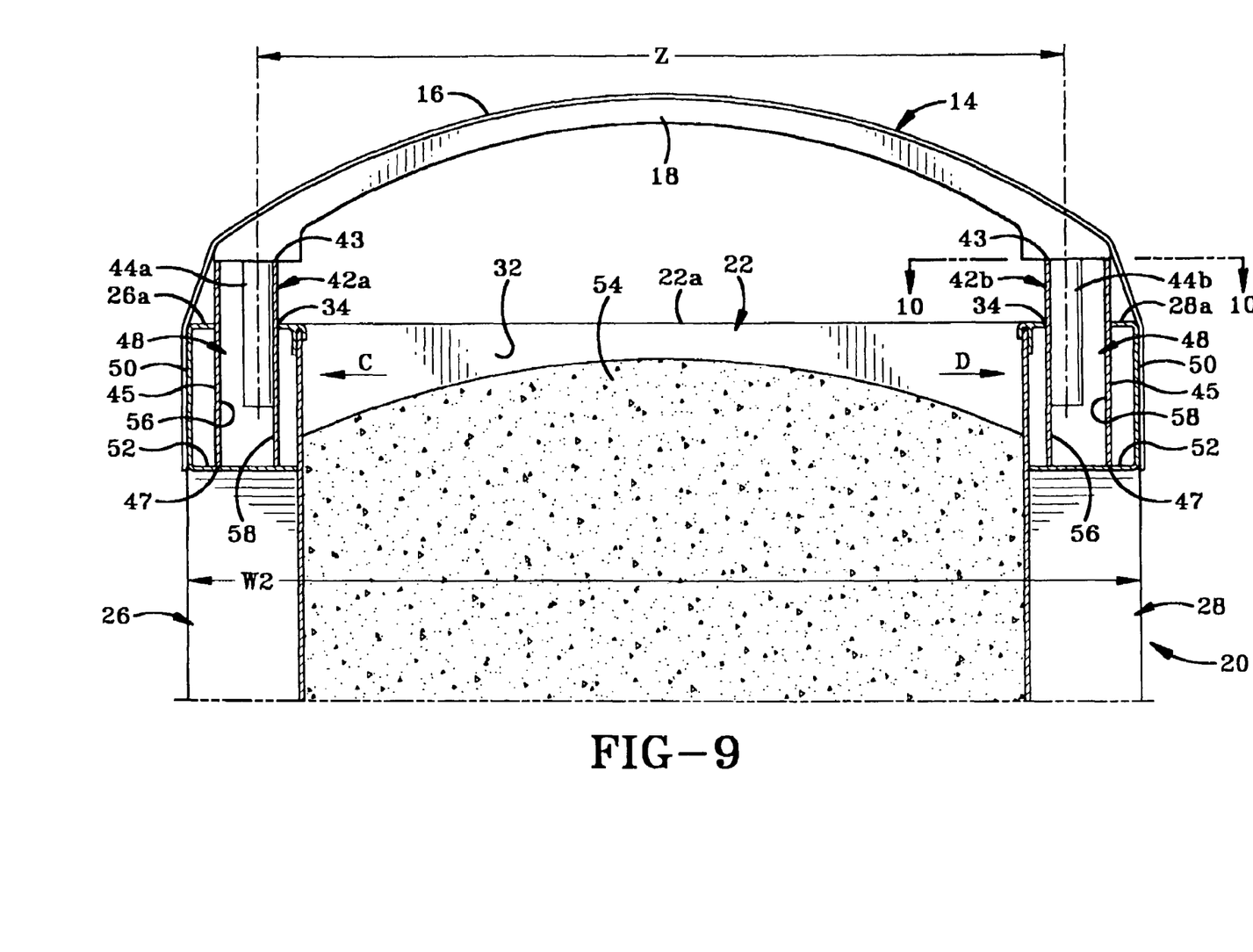
FIG. 9 is a partial cross-sectional rear view of the cargo box and bow ends engaged with the inserts when the cargo box is carrying a load that deflects the side walls outwardly away from each other.
Figure 10:
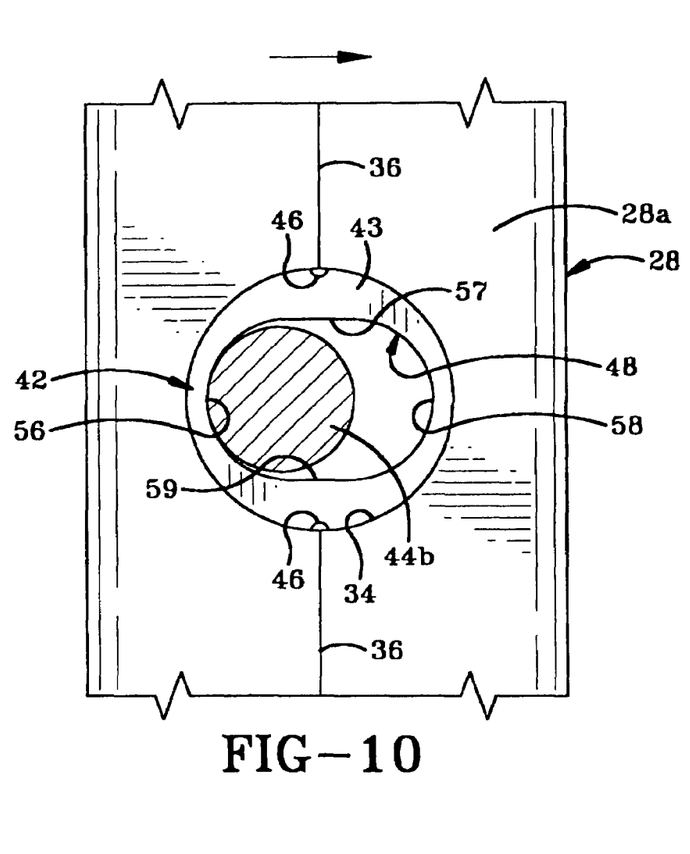
FIG. 10 is a top view of the bow end and insert taken through line 10-10 of FIG. 9.

FIGS. 9 and 10 illustrate a condition in which cargo box 20 is carrying a load 54 therein and load 54 is causing side walls 26, 28 to deflect and move away from each other as indicated by arrows "C" and "D". When this occurs, the distance between side walls 26, 28 increases from W1 to W2. The bow 18, however, remains a constant length "Z". As side walls 26, 28 spread apart from each other, ends 44a, 44b of bow 18 are able to slide within the oblong bores 48 of inserts 42a, 44b. Thus, when side walls 26, 28 are their maximum distance W2 apart from each other as shown in FIG. 9, end 44a abuts end 58 of bore 48 in insert 42a and end 44b abuts end 56 of bore 48 in insert 42b. Although not illustrated, ends 44a, 44b can also ride up somewhat within the bores 48 so that the distance between the outermost edge of end 44a, 44b and lower surface 47 of insert 42 is increased. Thus, the side walls 26, 28 may move outwardly away from each other, but bow 16 is not placed under any additional strain and ends 44a, 44b are undamaged. When load 54 is removed from cargo box 20, side walls 26, 28 return to their original distance W1 from each other. As this occurs, ends 44a, 44b of bow 16 are able to slidably move within the bores 48 of inserts 42a, 42b, and no additional strain is placed on bow 16.

Thus, in the preferred embodiment of the invention, inserts 42 retain the downwardly extending ends 44a, 44b of bow 16 therein, but because of the difference in shape and size between the bore 48 of insert 42 and the ends 44a, 44b, the ends 44a, 44b of the bow 16 have some room in which to move either back and forward or side to side within bore 48.

Figure 11:
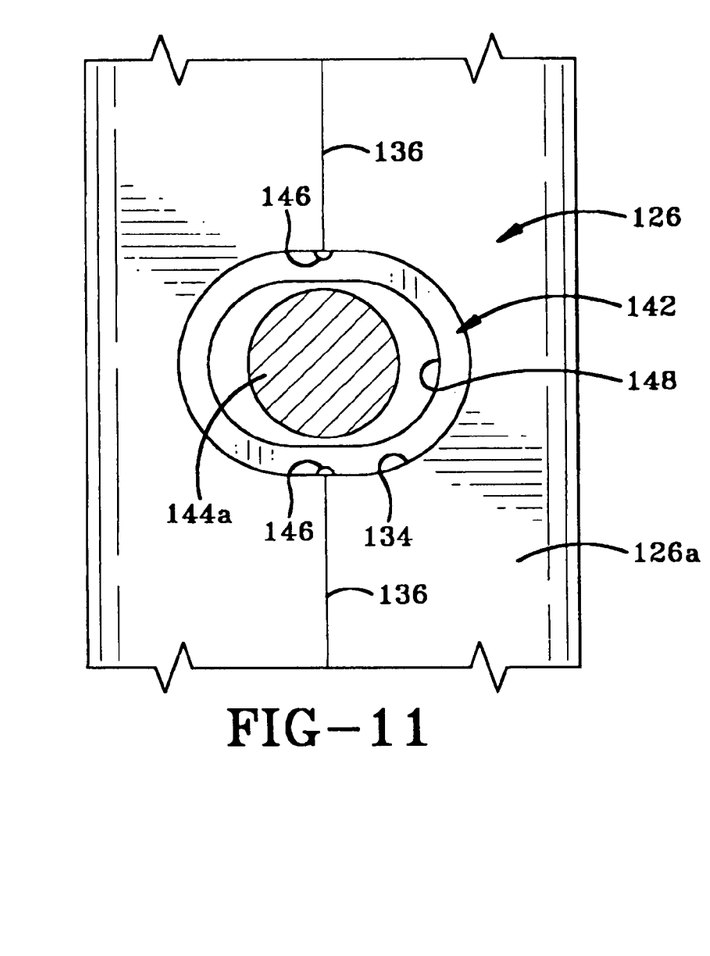
FIG. 11 is a top view of a second embodiment of the bow end and insert in accordance with the present invention.

FIG. 11 illustrates a second embodiment of a hole and insert drilled and retained in side wall 126. In this second embodiment, both hole 134 and insert 142 having a generally oblong or elliptical shape. Insert 142 is complementary in size and shape to hole 134 so that it is frictionally retained therein. As with the previous embodiment, insert 142 has an oblongly shaped bore 148 therein and is adapted to receive the generally circular end 144a of a bow therein. Insert 142 also includes markers 146 to enable it to be aligned with the indicator line 136 on upper surface 126a of side wall 126. Insert 142 functions in substantially an identical manner to previously described insert 42.

Figure 12:
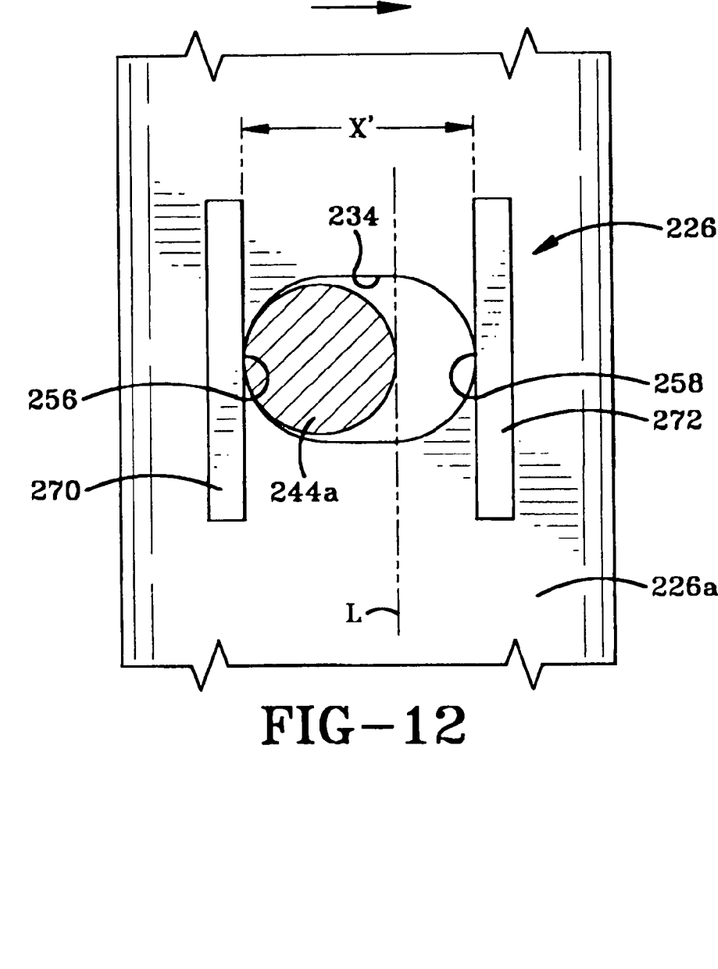
FIG. 12 is a top view of a third embodiment of the bow end engaged in the aperture in the side wall and in accordance with the present invention.

FIG. 12 illustrates a third embodiment of the invention. In this instance, a generally oblong hole 234 is drilled in upper surface 226a of side wall 226. Hole 234 is oriented so that its length X' is disposed substantially at right angles to the longitudinal axis "L" of side wall 226. Side wall 226 is provided with reinforcements 270, 272 proximate the inner and outer arcuate ends 258, 256 of hole 234. Reinforcements 270, 272 may be small lengths of metal that are welded onto upper surface 226a of side wall 226. In this instance, no insert or indicator lines are required for operation of the system. Reinforcements 270, 272 are provided to prevent end 244a of the bow from damaging the metal surrounding hole 234 in upper surface 226a as the side walls of the trailer move apart under pressure exerted by a load carried therein.

Alternatively, a plurality of brackets may be secured at intervals to side walls 26, 28 and the oblong shaped apertures be formed in the horizontal upper surface of those brackets in such a manner that the brackets effectively are an extension of the horizontal upper surface of the side walls. The brackets may also be provided with reinforcements to reduce the possibility of damage to the brackets by the ends of the bows retained therein. Alternatively, the brackets may be provided with holes that receive inserts which have the oblong shaped apertures therein as described above.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A cargo box for a truck trailer that is selectively coverable with tarpaulin supported on a plurality of bows, wherein each bow has a central supporting section and spaced-apart vertically oriented ends;
    and wherein said cargo box comprises:
        a front wall;
        a rear wall;
        a pair of side walls extending between the front and rear walls,
    wherein each of said side walls has a horizontal upper surface and a longitudinal axis that extends between the front and rear walls of the cargo box; and
        a plurality of spaced-apart apertures provided in the horizontal upper surface of each side wall, each aperture being adapted to receive one of the ends of one of the bows therein; said apertures each being sized to loosely retain the one of the ends of the bows therein and permit lateral sliding motion thereof within the aperture in a direction perpendicular to the longitudinal axis of the side wall.

2. The cargo box as defined in claim 1, wherein each aperture has a substantially oblong shape; said oblong shape having an inner arcuate end and an outer arcuate end connected together by opposing sections; and wherein said aperture has a first length between said inner and outer arcuate ends and a second length between said opposing sections; said first length being greater than the second length; and wherein the first length is oriented at right angles to the longitudinal axis of the side wall.

3. The cargo box as defined in claim 1, wherein the box further includes a first reinforcement, said first reinforcement being positioned proximate one of the inner and outer arcuate ends of the aperture.

4. The cargo box as defined in claim 3, wherein the first reinforcement comprises a length of metal secured to the upper surface of the side wall adjacent the aperture.

5. The cargo box as defined in claim 3, further comprising a second reinforcement positioned proximate the other of the inner and outer arcuate ends of the aperture.

6. The cargo box as defined in claim 1, wherein the side walls of the cargo box further include a plurality of spaced-apart holes formed in the upper surface of the side walls; and the cargo box further includes a plurality of inserts; each insert having an outer wall that is complementary in cross-sectional shape to one of the holes and is receivable therein; and wherein each of the inserts includes a longitudinal bore therein, and wherein the bores of the inserts comprise the apertures that are adapted to receive one of the ends of one of the bow therein.

7. The cargo box as defined in claim 6, wherein the inserts comprise elongated tubular members that are each frictionally received through one of the holes in the side walls so that a first portion thereof is received within an interior chamber in the side wall; and a second portion thereof extends outwardly away from the horizontal upper surface of the side wall.

8. The cargo box as defined in claim 7, wherein each of the holes has a circular cross-sectional shape and each of the inserts has a substantially circular outer wall that is sized to be frictionally received within one of the holes.

9. The cargo box as defined in claim 7, wherein each of the holes has an oblong cross-sectional shape and each of the inserts has a substantially oblong outer wall that is sized to be frictionally received within one of the holes.

10. The cargo box as defined in claim 6, wherein the bore in each of the inserts is substantially oblong in shape.

11. The cargo box as defined in claim 10, wherein the insert has an upper surface and a lower surface and the outer wall extends between the upper and lower surfaces; and wherein the insert is further provided with a pair of opposing markers formed on at least one of the upper surface and outer wall of the insert.

12. The cargo box as defined in claim 11, wherein the markers comprise one of a line and a groove.

13. The cargo box as defined in claim 12, wherein the oblong bore of each insert has an inner arcuate end and an outer arcuate end and a pair of sections joining the inner and outer arcuate ends together; and wherein the markers are provided in a portion of the outer wall that aligns with a center point of each of the sections of the bore.

14. The cargo box as defined in claim 10, wherein the upper horizontal surfaces of the side walls are each provided with a longitudinal line thereon, said line being aligned with the longitudinal axis of the side wall; and wherein said markers on the inserts are alignable with the line to correctly orient the insert within the holes in the side walls.

15. In combination:
a cargo box of a truck trailer having a front wall, a rear wall and opposing side walls connected together by a bottom wall, said walls defining an interior cavity for retaining a load therein;
a tarpaulin;
a plurality of bows for supporting the tarpaulin over the cavity of the cargo box, each bow including an arcuate section that has ends extending downwardly away therefrom; each of said ends having a cross-sectional shape of a first size; and
a plurality of spaced-apart apertures formed in a horizontal upper surface of each of the side walls of the cargo box, said apertures being formed in aligned pairs; wherein each of said apertures is of a shape suitable for receiving one of the ends of the bows therethrough; and wherein each aperture is of a second size that is greater than the first size of the ends of the bows; whereby each end of each one of the bows is loosely retained within one of the apertures in the side walls of the cargo box and is slidable therein.

16. The combination of claim 15, wherein the ends of the bows are circular in cross-sectional shape and the apertures are oblong in shape.

17. The combination of claim 16, further comprising a line formed on the upper horizontal surface of each side wall and extending between the front and rear walls of the cargo box; and wherein the shape of the oblong apertures includes a first shorter length and a second longer length; and wherein the second longer lengths of the apertures are disposed substantially at right angles to the longitudinal lines on the side walls.

18. The combination of claim 16, wherein the side walls of the cargo box further include a plurality of spaced-apart holes therein, and the combination further includes a plurality of inserts, each inserts being shaped to be tightly received in one of the holes; and wherein each insert includes a bore and the bores of the inserts constitute the oblong-shaped apertures formed in the upper surfaces of the side walls.

19. The combination as defined in claim 18, wherein each insert has an outer wall that surrounds and defines the bore; and wherein the inserts further include a pair of opposed markers formed in the outer surface of the insert; said markers being selectively alignable with the longitudinal line on one of the side walls of the cargo box to correctly orient the oblong apertures relative to the longitudinal line.

20. The combination as defined in claim 19, wherein the ends of the bows are loosely receivable within the apertures such that movement of the side walls away from each other under pressure of a load contained within the cargo box, causes the ends of the bows to slide laterally within the apertures in a direction substantially at right angles to the longitudinal lines on the side walls of the cargo box.

* * * * *